June 11, 1963  H. L. DOBRIKIN  3,093,324
VEHICLE LAMP
Filed Jan. 27, 1960
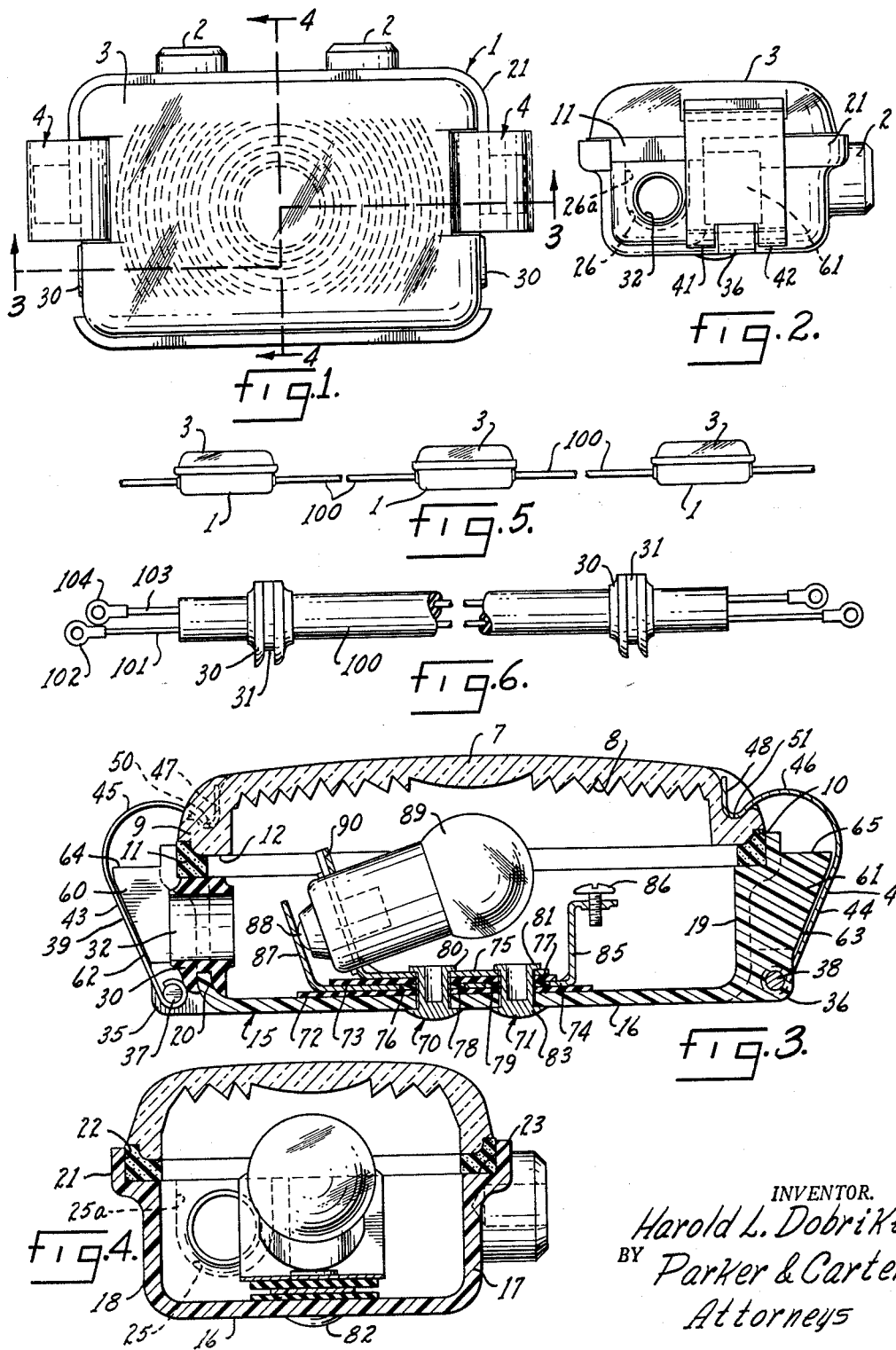
INVENTOR.
Harold L. Dobrikin,
BY Parker & Carter
Attorneys 3,093,324
VEHICLE LAMP
Harold L. Dobrikin, Chicago, Ill., assignor to Berg Airlectro Products Company, Chicago, Ill., a corporation of Illinois
Filed Jan. 27, 1960, Ser. No. 4,986
2 Claims. (Cl. 240—8.2)

This invention relates to lights and has particular relation, for example, to the external lighting system of vehicles such as trucks and the like.

One purpose of the invention is to provide a clearance light and housing structure which shall be effective to serve the combined functions of a clearance light structure and a junction box.

Another purpose is to provide a truck lighting system effective to employ shortened lengths of wire for ease in replacement and safety in operation.

Another purpose is to provide a particular attachment means for the lens of a clearance light.

Another purpose is to provide a clearance light and housing structure having attachment means for the lens thereof of maximum ease and simplicity in operation.

Another purpose is to provide a light and housing structure therefor having attachment means for the lens thereof effective to permit replacement of the bulb of said lighting structure without the employment of tools of any kind.

Another purpose is to provide an attachment means for the lens of a light and housing structure, including means for preventing the unintended release of said attachment means.

Another purpose is to provide a light and housing structure effective to serve the additional function of a junction box and having particular means for admitting wire and cable thereto.

Another purpose is to provide a particular means for sealing wires or cables entering a junction box at their point of entrance.

Another purpose is to provide a light and housing structure having a light-refracting lens and an attachment means therefor effective to removably retain said lens, and a sealing means for wires or cables entering said housing, said sealing means being positioned and rendered more effective by said lens and attachment means.

Another purpose is to provide a housing structure and junction box having sealing means removably positioned therein.

Another purpose is to provide a housing structure of minimum simplicity and maximum economy in manufacture and use.

Another purpose is to provide a lighting system for vehicles and the like, including shortened lengths of wire and cable, and a light housing structure effective to permit the use of such shortened lengths in a system incorporating a plurality of lights and housings therefor.

Another purpose is to provide a light and housing structure wherein a manually operable attachment means performs the dual function of removably retaining a lens and compressibly positioning a housing entry seal.

Other purposes will appear from time to time during the course of the specification and claims.

The invention is illustrated more or less diagrammatically in the accompanying drawings, wherein:

FIG. 1 is a top plan view;
FIG. 2 is a side elevation;
FIG. 3 is a view taken on the line 3—3 of FIG. 1;
FIG. 4 is a view taken on the line 4—4 of FIG. 1;
FIG. 5 is a schematic view illustrating the system of the invention; and FIG. 6 is a detail view illustrating a cable element of the invention.

Like parts are indicated by like numerals throughout the specification and drawings.

Referring now to the drawings and particularly to FIG. 1 thereof, the numeral 1 indicates generally a light housing. Indicated at 2 is a pair of threaded bosses useful in attaching the housing 1 to the outer side wall of a vehicle such as a truck. A light-transmitting lens is indicated generally at 3 and a pair of attachment means for the lens 3 is illustrated at 4 generally.

Referring now particularly to FIG. 3, it will be seen that the lens 3 has a light-transmitting wall portion 7, the inner face 8 of which is grooved or otherwise formed to produce refraction of light rays impinging thereon. A peripheral flange 9 extends from the periphery of wall 7 of lens 3 and carries a circumferential recess 10 for reception of a portion of ring gasket 11. The flange 9 has an annular flat edge portion 12 seated in part upon gasket 11.

A boxlike housing, indicated generally by the numeral 15, has a generally rectangular bottom wall 16 with parallel, spaced longitudinal side walls 17, 18 joined at their opposite ends by end walls 19, 20. The walls 17–20 define a generally rectilinear opening bounded by a substantially continuous, outwardly offset, axially extending flange 21. The inner wall of the flange 21, indicated at 22, and the upper edge of the walls 17–20, indicated at 23, together define a trough receiving the gasket 11.

Each of the walls 19 and 20 has a generally U-shaped opening indicated at 25, 26. The openings 25, 26 have a lower curved bottom edge upwardly spaced from the bottom wall 16 and a set of parallel side edges indicated at 25a, 26a which intersect the upper edge of the associated wall 19, 20, respectively.

Removably inserted in the openings 25, 26 are grommetlike seal members 30. The seal members 30 may be formed of rubberlike material and may have a generally U-shaped groove 31 receiving the edges 25a, 26a and the lower curved edges of the openings 25, 26. The members 30 have an axial circular passage or bore 32 formed therein.

A set of ears 35, 36 extend in opposite directions from lower portions of the outer surfaces of walls 19, 20. Each of the ears 35, 36 has a pin or post 37, 38 extending therethrough and in opposite directions therefrom in parallel relation with the associated walls 19 and 20. Rotatably carried by the pins 37, 38 are leaf spring attachment members 39, 40, respectively. Each of the members 39, 40, as best seen in FIG. 3, has a pair of spaced ear portions such as those illustrated at 41, 42 in FIG. 2, which are turned about the pins 37, 38. The members 39, 40 have substantially flat portions 43, 44, respectively, extending upwardly and outwardly in inclined planes from the pins 37, 38. The portions 43, 44 continue into inwardly directed arcuate or curved portions 45, 46, respectively. The portions 45, 46 terminate in reverse end portions 47, 48, respectively, the portions 47, 48 constituting finger portions receivable in correspondingly shaped indentations 50, 51 formed in the upper surface of lens 3 and paralleling the opposite lateral edges of lens 3 substantially centrally thereof.

Backing blocks 60, 61 are formed integrally with and extend outwardly from the outer surface of the end walls 19, 20 and between said walls and the spring clips 39, 40, respectively. The blocks 60, 61 have outwardly, upwardly inclined outer wall surfaces 62, 63 adjacently paralleling the portion 43, 44 of spring clips 39, 40, respectively, and the blocks 60, 61 have upper flat surfaces 64, 65, respectively, extending inwardly from a point adjacent the point at which the clips 39, 40 begin the curved portions 45, 46.

Securing means, such as those indicated at 70, 71, penetrate the housing wall 16 and secure against the inner surface thereof alternating insulating strips 72, 73 and electric energy-transmitting metal strips 74, 75. The strip 74 has apertures 76, 77 through which the members 70, 71 extend. The apertures 76, 77 in strip 74 are larger than the circumference of members 70, 71, and insulating rings 78, 79 are positioned in apertures 76, 77 to insulated strip 74 from the members 70, 71. The members 70, 71 have annular flanges 80, 81 in contact with strip 75 and heads 82, 83 in contact with the outer surface of wall 16. The strip 74 has an upturned portion 85 having a wire-attaching assembly 86 associated therewith, and an upturned opposite end portion 87 positioned for contact with an end 88 of a light bulb 89. The socket of which is in contact with and supported by an upturned portion 90 of strip 75.

Referring now to FIG. 5, I illustrate a plurality of the housings 1, it being understood that any number thereof may be employed in connection with a vehicle such as a truck or the like. Individual lengths of wire of cable 100 extend between the adjacent housings of each set of two such housings 1. In FIG. 6, I illustrate, for example, one of the shortened cable lengths 100. In the member 100 may be a first conductor or wire 101 extending outwardly from the opposite ends of the cable insulating wrapping or cover and carrying electrical contact or attachment means 102 at its opposite ends. In some cases additional conductors, such as the illustrated second wire, may be positioned within cable covering of member 100 and have outwardly extending portions 103 at the opposite ends thereof with attachment or contact elements 104 at the opposite ends of the member 103. The members 100 may be supplied with a grommet 30 already positioned about and frictionally retained on its opposite end portions for ready insertion in the openings 25, 26 upon manual displacement of clips 39, 40 and removal of lens 3 and gasket 11.

The use and operation of the invention are as follows:

With a bulb 89 properly positioned, as illustrated for example in FIG. 3, the lens 3 and gasket 11 are seated within the recess formed by wall surfaces 22, 23 and the leaf spring clips 39, 40 are snapped into place with their contacting ear segments 47, 48 positioned within receiving sockets 50, 51 formed in the outer surface of lens 3.

For purposes of exchanging bulbs or other repairs to the structure within the clearance light assembly of the invention, the spring clips 39, 40 may be easily and simply manually snapped outwardly, the end portions 47, 48 being free to ride over the outer lip portions of the sockets 50, 51 in lens 3. Thereafter the lens 3 may be easily manually removed and appropriate repairs or replacements made within the housing body 15.

In the initial installation of the wire or cable members for connection to terminal 86, the seals or grommets 30 are easily and simply manually inserted in the slots or openings 25, 26 in the walls 19, 20. The cables, such as the shortened lengths indicated at 100, are inserted or passed through the bore 32 in the grommets 30 and the appropriate connections made with the terminal 86 or with the inwardly extending connector elements 102 or 104 of a cable extending through a bore 32 in another grommet 30 positioned in the wall of the housing 15. When the gasket 11 and lens 3 are positioned to close the opening in housing 15, and the snap clips 39, 40 are snapped into place to secure the lens to housing 15, the action of the clips 39, 40 is effective to press the lens and gasket downwardly atop the upper portion of grommets 30 and thereby effectively to secure and position the grommets 30, as well as to compress the rubberlike material of which the grommets 30 are formed, resulting in a more effective sealing and gripping action of the grommet 30 about the cable or wire passed through the bore 32 thereof, protecting the area inside the structure of the invention from moisture, dirt, the elements and other foreign material.

While a set of two aligned openings 25, 26 is shown, it will be understood that a plurality of such openings could be spacedly located in the side walls of housing 15, the entire structure of the invention serving as it does, and as shown, the combined functions of a light housing and an electrical junction box.

The built-up or block segments 60, 61 of housing 15 are effective to provide a stop or abutment means for the spring clip segments 43, 44. Thus unintentional inwardly-directed pressure resulting from contact of segments 43, 44 with three branches, stones, posts or other extraneous elements cannot result in the unintentional movement of the segments 43, 44 toward the housing 15 and resulting release of attachment means 39, 40.

I claim:

1. In a light and housing structure, a boxlike housing having an open end, a cover for said end, said cover being formed of light-transmitting material and having a notch formed therein, an attaching means for said cover comprising a spring clip member rotatably supported on said housing and having an end portion yieldingly engaging said notch in said cover, said housing having abutment means formed integrally with said housing and between said housing and said clip member, said abutment means being formed and positioned to abut a major segment of said clip to limit inward movement of said clip member towards said housing, a major segment of said abutment and said major segment of said clip lying in substantially parallel planes for substantially the entire length of said clip segment.

2. For use in a vehicle external light system, a combination light housing and junction box structure comprising a box-like housing having a bottom wall, a substantially continuous side wall, said side wall having a cover-receiving surface, a plurality of U-shaped openings in said side wall, said openings intersecting said cover-receiving surface, and a cover adapted to seat upon said cover-receiving surface, said cover being formed substantially of light-transmitting material, and yielding means movably secured to said housing and engaging said cover and urging said cover toward said cover-receiving surface, a U-shaped, axially apertured seal member seated in each of said side wall openings and having a relatively flat surface intersecting said cover-receiving surface in position to be compressed by said cover in response to said urging thereof by said yielding means, each of said seal members having a set of U-shaped lips engaging said side wall adjacent said opening, said cover having pockets formed in the outer surface thereof, said yielding means comprising a plurality of spring clip members, said spring clip members being pivotally secured to said housing and having a first portion curved inwardly toward said housing and terminating in an end portion adapted to seat yieldingly in said pockets, abutment means secured to said housing and extending substantially along and adjacent said clip first portion in an upwardly, outwardly direction from said housing, said abutment means being positioned between said housing and said spring clip first portion to prevent inward movement of said spring clip first portion toward said housing beyond a predetermined point when said clip is in engagement with said cover.

References Cited in the file of this patent

UNITED STATES PATENTS

| | | |
|---|---|---|
| 1,620,414 | Vanderlip | Mar. 8, 1927 |
| 2,038,506 | Cadieux | Apr. 21, 1936 |
| 2,420,826 | Irrgang | May 20, 1947 |
| 2,475,243 | Irrgang | July 5, 1949 |
| 2,661,229 | Slaughter | Dec. 1, 1953 |
| 2,754,410 | Thielorn | July 10, 1956 |
| 2,769,082 | Steiner et al. | Oct. 30, 1956 |
| 2,807,710 | Williams | Sept. 24, 1957 |

(Other references on following page)

UNITED STATES PATENTS

| | | |
|---|---|---|
| 2,814,722 | Diedring | Nov. 26, 1957 |
| 2,874,270 | Douglass et al. | Feb. 17, 1959 |
| 2,910,577 | Bolmeyer | Oct. 27, 1959 |
| 2,922,875 | Buck | Jan. 26, 1960 |
| 2,932,727 | Larsen | Apr. 12, 1960 |

FOREIGN PATENTS

| | | |
|---|---|---|
| 650,292 | Great Britain | Feb. 21, 1951 |
| 817,002 | Germany | Oct. 15, 1951 |
| 472,830 | Italy | July 2, 1952 |
| 476,736 | Italy | Dec. 22, 1952 |
| 476,786 | Italy | Dec. 23, 1952 |